J. HILL.
Pill-Machines.
No. 197,779. Patented Dec. 4, 1877.
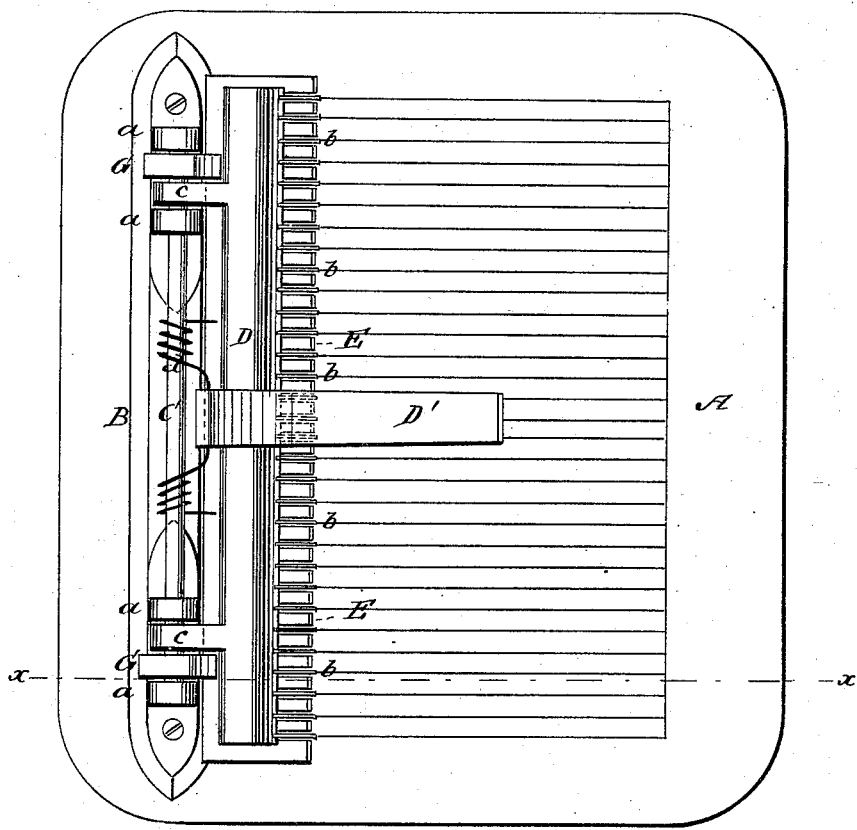
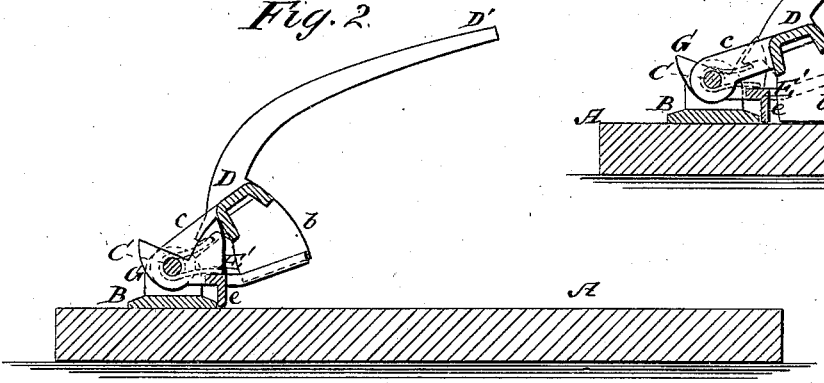
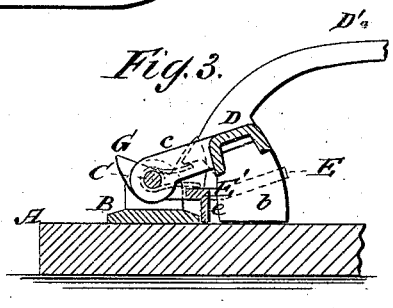
WITNESSES:
E. Wolff
J. H. Scarborough
INVENTOR:
John Hill.
BY Munn & Co
ATTORNEYS.

UNITED STATES PATENT OFFICE.

JOHN HILL, OF SOUTH NORWALK, CONNECTICUT.

IMPROVEMENT IN PILL-MACHINES.

Specification forming part of Letters Patent No. 197,779, dated December 4, 1877; application filed June 25, 1877.

*To all whom it may concern:*

Be it known that I, Dr. JOHN HILL, of South Norwalk, in the county of Fairfield and State of Connecticut, have invented a new and Improved Pill-Machine, of which the following is a specification:

This invention has relation to machines for making pills; and the nature of my invention consists in a series or gang of blades fixed to a vibrating bar, and adapted for dividing the rolls of pill-mass upon a tablet, in combination with pivoted clearers which separate the mass from the cutters, as will be hereinafter explained.

In the annexed drawings, Figure 1 is a top view of my improved machine applied to a tablet. Fig. 2 is a section through dotted line $x\,x$, showing the cutters and clearers raised from the tablet. Fig. 3 is a similar view of same parts, showing the cutters down upon the tablet.

Similar letters of reference indicate corresponding parts.

In the annexed drawings, A designates a well-known apothecary's tablet, which is suitably marked off by gage-lines, as shown in Fig. 1. Near one end of this tablet I rigidly secure a base plate, B, which is constructed with eye-bearings $a$, that receive a rod, C, through them.

D designates a channeled bar, to which knives $b$ are rigidly secured, and arranged in planes parallel to each other and perpendicular to the face of the tablet. This bar D is provided with a handle, D', and it is pivoted, by means of short arms $c$, to the rod C, and acted on by a spring, $d$, which raises it to the position shown in Fig. 2.

E designates the clearing-teeth, which receive between them the knives $b$, and separate the pieces of pill-mass from the knives after the cutting stroke is given to them. The teeth are all formed on a bar, E', the flanged portion $e$ of which rests upon the tablet A, and affords a stop when the parts are in the position shown in Figs. 2 and 3. Bar E' is pivoted on the rod C by means of angular arms G, the angles of which serve as stops for checking the knife-bar D in the position shown in Fig. 2, and also when thrown entirely back.

Having prepared a roll of pill-mass of the desired length, it is adjusted on the tablet A beneath the clearing teeth or comb, and divided by depressing the knives $b$. The knives and clearing-teeth are then raised and thrown back out of the way, and the bits of pill-mass are removed from the tablet and rolled into pills, in the usual manner.

Having thus described my invention, I claim as new and desire to secure by Letters Patent—

1. A series of cutters, $b$, fixed to a vibrating bar, D, in combination with pivoted bar E', having clearing-teeth E, substantially as described.

2. The pivoted toothed bar E', having a flange, $e$, and angular stop-arms G, in combination with the knife-bar D and spring $d$, substantially as described.

JOHN HILL.

Witnesses:
JOHN W. DAKE,
WILLIAM H. LATTIN.